United States Patent
Zheng et al.

(10) Patent No.: US 6,634,722 B1
(45) Date of Patent: Oct. 21, 2003

(54) VEHICLE BRAKING SYSTEM WITH PROPORTIONAL POPPET VALVE PRESSURE CONTROL STRATEGY

(75) Inventors: Yuhong Zheng, Ann Arbor, MI (US); Danny R. Milot, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/919,445

(22) Filed: Jul. 31, 2001

(51) Int. Cl.$^7$ .................................................. B60T 8/34
(52) U.S. Cl. ..................... 303/113.1; 303/20; 303/115.2
(58) Field of Search ......................... 303/113.1, 122.05, 303/122.08, 3, 15, 16, 20, 119.2, 119.1, 115.2; 188/1.11 E

(56) References Cited

U.S. PATENT DOCUMENTS

| | | | | |
|---|---|---|---|---|
| 5,297,860 A | * | 3/1994 | Nakamura | 303/119.2 |
| 5,904,335 A | * | 5/1999 | Oyama | 303/119.2 |
| 5,934,767 A | | 8/1999 | Schmidt et al. | |
| 5,941,608 A | | 8/1999 | Campau et al. | |
| 6,030,055 A | | 2/2000 | Schubert | |
| 6,086,167 A | | 7/2000 | Heckmann et al. | |
| 6,164,734 A | * | 12/2000 | Otomo et al. | 188/1.11 E |
| 6,226,586 B1 | | 5/2001 | Luckevich et al. | |
| 6,389,349 B1 | | 5/2002 | Hachtel | |
| 6,456,921 B1 | | 9/2002 | Bodie et al. | |

FOREIGN PATENT DOCUMENTS

| | | |
|---|---|---|
| DE | 196 54 769 A | 7/1998 |
| EP | 0 875 431 A | 11/1998 |

OTHER PUBLICATIONS

SAE Technical Paper #950762, Intelligent Braking for Current and Future Vehicles, Donald Schenk, et al.
SAE Technical Paper #960991, Electrohydraulic Brake System—The First Approach to Brake–By–Wire Technology, Wolf–Dieter Jonner, et al.

* cited by examiner

Primary Examiner—Jack Lavinder
Assistant Examiner—Melanie Torres
(74) Attorney, Agent, or Firm—MacMillan, Sobanski & Todd, LLC

(57) ABSTRACT

An electrohydraulic brake system where brake pressure is controlled by the combined action of an apply valve and a dump valve by the implementation of a method of controlling the voltage applied to the apply and dump valve. The EHB pressure control system receives a desired wheel pressure command and, with a caliper pressure feedback signal, implements an algorithm to compute one voltage command for the apply valve and another for the dump valve. The solenoids of the proportional apply and dump poppet valves are operated to control flow in or out of the brakes and modulate wheel pressure as required. The algorithm is used to control the electromagnetic poppet valves in all states of flow through the valve. The algorithm is a function of the existing pressure within the system and whether there is bulk or leakage flow through the valves.

16 Claims, 8 Drawing Sheets

VEHICLE BRAKING SYSTEM WITH PROPORTIONAL POPPET VALVE PRESSURE CONTROL STRATEGY

BACKGROUND OF THE INVENTION

This invention relates in general to braking systems, and in particular to an algorithm for electronically controlling poppet valves in an electrohydraulic brake system to control the pressure of brake fluid applied to vehicle wheel brakes.

Traditional hydraulic brake systems include a brake pedal operated by the driver of a vehicle. The brake pedal operates a master cylinder, causing the master cylinder to send pressurized hydraulic brake fluid to the wheel brakes of a vehicle. This is sometimes referred to as foundation or base braking—the basic braking called for by the operator of a vehicle. Over the years, engineers have worked to improve the performance of the braking system of vehicles by augmenting or replacing the base braking function with other braking operations.

Electrohydraulic brake (EHB) systems utilize electronically controlled valves, pumps, or a combination thereof to augment, replace, or control the base braking operation of a vehicle brake system. One of the first of many advanced braking functions that has been developed for vehicles is ABS (Antilock Braking System), which typically involves the operation of valves and pumps to selectively release and re-apply brakes during a braking operation. While typical base braking is commanded by the operator, ABS braking controls the vehicle brakes to recover from and limit skidding of a vehicle's wheels due to braking the wheels harder than permitted by the available coefficient of friction of the road surface. Since pumps and valves are electronically controlled to augment the base braking operation, a vehicle equipped with ABS may generally be said to have an EHB system. Another advanced braking function that may be accomplished by a properly configured EHB system is VSC (Vehicle Stability Control), which is a system for selectively actuating vehicle brakes to improve the stability of a vehicle during vehicle maneuvers. Other braking applications producing a pressure command input to the present invention include DRP (Dynamic Rear Proportioning—a system for controlling the front to rear proportioning of a vehicle braking command), TC (Traction Control—which typically involves selective application of brakes during vehicle acceleration to recover from and limit skidding of a vehicle's wheels due to accelerating the wheels faster than permitted by the available coefficient of friction of the road surface), ACC (Autonomous Cruise Control—a cruise control system that can actuate vehicle brakes to maintain proper vehicle spacing relative to a vehicle in front) and similar functions.

Various forms of electrohydraulic braking systems have been proposed. For example U.S. Pat. No. 5,941,608, Campau, et al. discloses an electronic brake management system with manual fail-safe capabilities. A subset of electrohydraulic braking systems is an electronic brake management system (EBM). EHB systems can allow braking to be primarily controlled by the vehicle driver with a conventional master cylinder system. Additionally, an electronically controlled portion of the system operates the brakes under certain conditions, i.e. anti-lock, traction control, etc. Primary braking is controlled electronically in Electronic Brake Management systems. Normally, the vehicle driver or a safety system generates an electronic signal, which in turn operates the pumps and valves to achieve a braking pressure within the system. A pedal simulator creates the effect for the driver of applying direct braking pressure. A master cylinder is available for providing a back-up braking system in case of a failure of the primary system. In the back-up system, a master cylinder acts during the failure event and provides the hydraulic pressure that actuates the brakes.

In Campau, et al., as well as in many EHB systems, there are a series of valves in the hydraulic circuit that operate to apply pressure to or release pressure from the brake. In one embodiment of Campau, proportional control valves are provided for each vehicle brake. In a first energized position, an apply position, a proportional control valve directs pressurized hydraulic fluid supplied to the proportional control valve from a fluid conduit to an associated fluid separator unit. In a second energized position, the maintain position, the proportional control valve closes off the port thereof which is in communication with the associated fluid separator unit, thereby hydraulically locking the associated fluid separator piston of the fluid separator unit in a selected position. In a de-energized position, the release position, the spool of the proportional control valve is moved by a spring to a position where the proportional valve provides fluid communication between the associated fluid separator unit and a reservoir. This vents pressure from the associated fluid separator unit allowing the piston thereof to move back to an unactuated position under the urging of an associated spring, thereby reducing pressure at the associated wheel brake.

The positions of the proportional control valves are controlled such that the pressure of fluid in the hydraulic circuit is controlled proportionally to the current of the energizing electrical signal. As a result, the exact position of a proportional control valve is proportional to the electrical control signal and pressure differential force acting on the armature. Thus, the proportional control valves can be positioned at an infinite number of positions rather than just the three positions described above.

Traditional valve control encompasses two positions: open or closed. In a closed position, ideally, there is no flow through the valve. In the open position, there is flow through the valve in proportion to the degree the valve is opened. Voltage across a controlling solenoid dictates the amount of valve opening. There are also two traditional types of valves that are used in hydraulic systems: spool valves and poppet valves. A major difference between poppet valves (used herein) and spool valves is that the leakage associated with poppet valves is electronically controllable. How to deal with poppet valve leakage is therefore important to the performance of an EHB system. A common practice is to minimize the effect of leakage through careful mechanical design and software algorithm. However, valve leakage may also be used to increase system resolution, reduce valve clicking noise if a valve is supposed to be open, while being eliminated to minimize flow consumption if a valve is supposed to be closed. This creates a system where the beneficial aspects of valve leakage can be taken advantage of while the negative aspects thereof can be suppressed.

The terms "bulk flow" and "leakage flow" are used to describe the primary types of flow through valves as used in this application. "Bulk flow", as used herein, means the flow in a valve that occurs when the moving valve element (such as the armature in poppet valves) is off of its seat. "Bulk flow" can also be described as flow through an open valve. "Leakage flow", as used herein, means that flow that generally occurs during closed valve operation due to limitations in the manufacturing process and the design of the valve. Depending on conditions of operation as well as the type of valve and its manufactured characteristics, some flow can leak through it, even with the valve in a "closed" position. "Leakage flow" as used herein also means that flow which occurs when the moving element is not fully seated against its seat or is only intermittently in contact with the seat (e.g. "chattering" or "simmering"). Either leakage or bulk flow can be "laminar flow" or "turbulent flow"; however, it can be expected that bulk flow will be turbulent flow. Laminar flow is classically defined as a well ordered pattern of flow whereby fluid layers are assumed to slide over one another. Turbulent flow is irregular or unstable flow.

While the above-described system and other existing systems have effectively managed the operation of valves in an EHB system, there is a need for greater incremental control of the valves, as well as accounting for the various flow states through the valves. One limitation in controlling valves in a closed or near-closed position is that it is difficult to control the change in pressure applied to the brake. As a result, pressure to a brake would increase more than demanded by the vehicle user. There also is a need to account for the noise or clicking of valves when fluctuating between a near closed and closed position. The algorithm described below provides finer control of proportional valves in a braking system by controlling the voltage applied to operate the valve. Also described, as part of the invention, is the method of operating the valves to account for leakage and bulk flow as well as preventing flow while in a closed state.

SUMMARY OF THE INVENTION

This invention relates to electrohydraulic braking (EHB) systems for vehicles and in particular to a method (algorithm) for controlling the pressure of brake fluid applied to the wheel brakes thereof. The algorithm interprets a braking pressure command input from any of a variety of braking functions, and controls the electromagnetic poppet valves to achieve the commanded pressure at a vehicle's brakes reliably and with good control in all states of flow (leakage or bulk) through the valves. Additionally, the pressure control system accepts inputs from advanced braking functions, such as ABS, VSC, TC, DRP, ACC, etc. More specifically, the purpose of the pressure control system is to provide adequate wheel pressure control with respect to dynamic response, tracking error, robustness and stability objectives, while taking into account issues such as vibration, noise and flow consumption. The pressure control system is intended for use with base braking functions, such as that described in U.S. Pat. No. 6,226,586, granted May 1, 2001, the disclosure of which is incorporated herein by reference.

The EHB pressure control system receives a desired wheel pressure command, and with a caliper pressure feedback signal, computes one voltage command for the apply valve and another one for the release valve, both corresponding to a requested flow from the hydraulics. The voltage command drives current control electronics. The electronics in turn selectively power the apply and release poppet valves to control flow in or out of the brakes and modulate wheel pressure as required.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
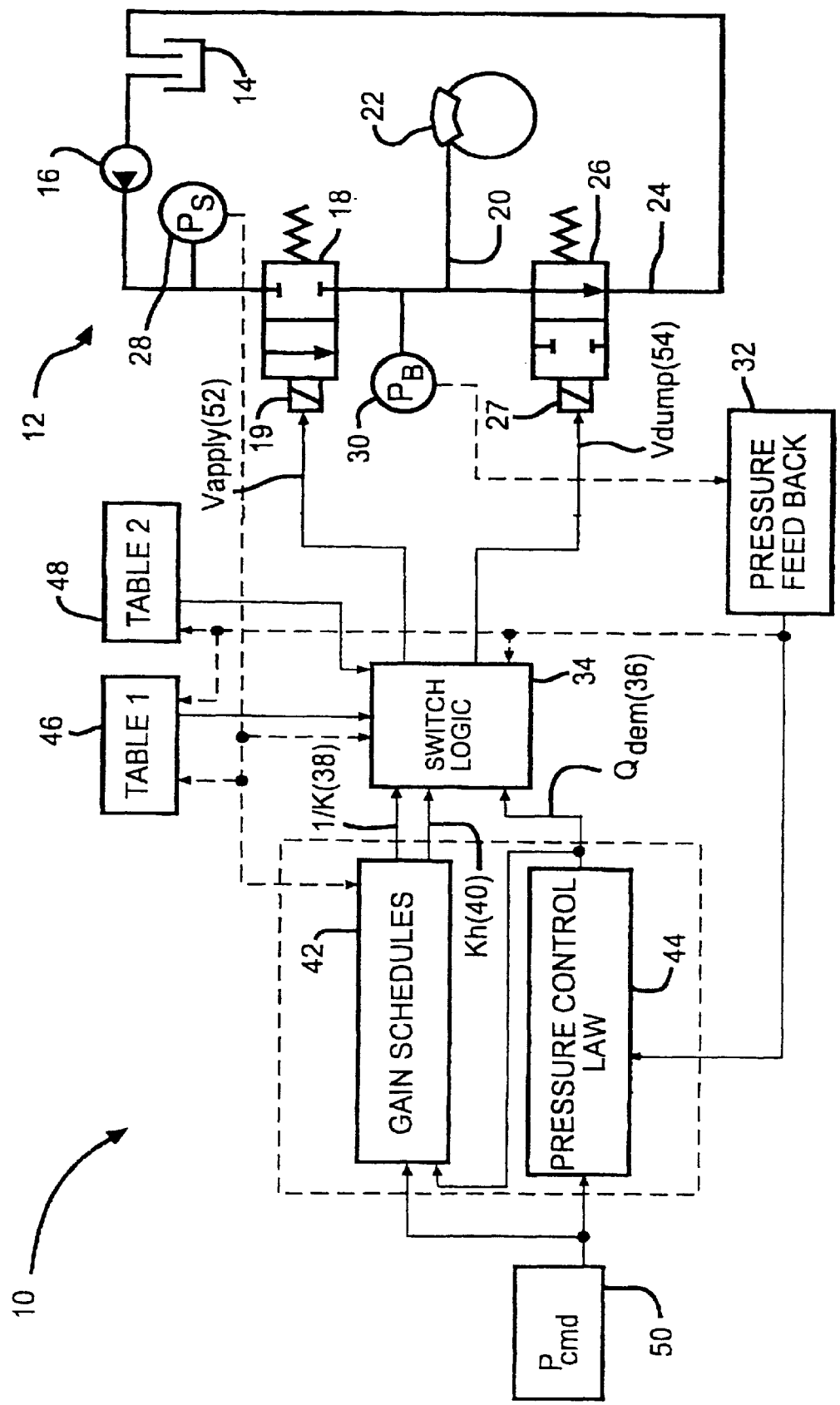
FIG. 1 is a simplified schematic view of a vehicle braking system and a portion of the electronic controls therefore.

Referring now to the drawings, there is illustrated in FIG. 1 a portion 10 of the electronic circuitry processing braking signals that implements a pressure control algorithm according to the present invention, together with a greatly simplified schematic representation of a typical EHB system 12. A more detailed description of an EHB system for which the algorithm of the present invention may suitably be used is described in U.S. Pat. No. 5,941,608 to Campau et al., the disclosure of which is hereby incorporated by reference. However, it should be understood that it is believed that the present invention may suitably be practiced in a variety of other EHB systems, including without limitation, the EHB system described in the SAE Technical Paper Series No. 950762, "Intelligent Braking for Current and Future Vehicles", and No. 960991, "Electrohydraulic Brake System—The First Approach to Brake-By-Wire Technology", the disclosures of which are also incorporated by reference. It should also be understood that although only one wheel brake 22 is shown in FIG. 1, that in actual vehicle use the system shown can be implemented to cooperate with a plurality of wheel brakes. This includes, but is not limited to, multiple pressure command signals, gain schedules, linear controllers, switch logic circuits, valve table values, apply and release valves, pressure feedback sensors and pumps.

The simplified EHB system 12 includes a fluid reservoir 14. A pump 16 pumps hydraulic brake fluid from the reservoir 14. The pump 16 (typically complemented by a high-pressure accumulator, not shown) supplies pressurized hydraulic brake fluid to an apply valve 18, which is preferably implemented as a normally closed solenoid 19 operated poppet valve. When the apply valve 18 is opened, pressurized hydraulic brake fluid passes through the apply valve 18, and flows through a conduit 20 to a vehicle wheel brake 22. A fluid conduit 24 is connected to the conduit 20 between the wheel brake 22 and the apply valve 18, and provides a return path for hydraulic brake fluid from the wheel brake 22 to the reservoir 14. A normally open solenoid 27 operated release valve 26 is disposed in the fluid conduit 24 to control the flow of hydraulic brake fluid through the fluid conduit 24.

The terms "bulk flow" and "leakage flow" have been referred to above (for example, in the Background and Summary of the Invention). "Bulk flow", as used in this application, means the flow in a valve that occurs when the moving valve element (such as the armature in poppet valves like the apply valve 18 and the release valve 26) is off of its seat. "Bulk flow" can also be described as the flow through an open valve. "Leakage flow", as used in this application, means that flow that generally occurs during closed valve operation due to limitations in the manufacturing process and the design of the valve. Depending on conditions of operation as well as the type of valve and its manufactured characteristics, some flow can leak through it, even with the valve in a "closed" position. "Leakage flow", as used in this application, also means that flow which occurs when the moving valve element is not fully sealed against its seat or is only intermittently in contact with the seat (e.g. "chattering" or "simmering"). For example, in a poppet valve, such as the apply valve 18 or release valve 26, leakage flow may occur when the valve poppet is held so lightly against the valve seat that, due to manufacturing imperfections, the valve poppet is only partially contacting the associated seat. Leakage flow also occurs when the valve poppet is intermittently in contact with the seat. Either leakage or bulk flow can be "laminar flow" or "turbulent flow"; however it can be expected that bulk flow will be turbulent flow. Laminar flow is classically defined as a well ordered pattern of flow whereby fluid layers are assumed to slide over one another. Turbulent flow is irregular or unstable flow.

Although poppet valves are preferred for use in this system, spool valves are also used in hydraulic systems. A major difference between poppet valves and spool valves is that there is a significant amount of leakage associated with poppet valves. How to deal with leakage is therefore important to the performance of the EHB system 12. A common practice is to minimize the effect of leakage through careful mechanical design and software algorithm. However, part of the invention strategy is to utilize leakage to increase system resolution in a low flow demand situation. Additionally, the valves are controlled to reduce the clicking noise of a valve, caused by intermittent contact of the moving valve element with the seat, if the valve is supposed to be open. This control will also eliminate leakage, as much as possible, to minimize flow consumption if the valve is supposed to be closed. This strategy takes advantage of the "good" aspects of leakage as well as suppressing the "bad" aspects of leakage.

A pressure control algorithm contains specific functions that have been designed so that a complete closed-loop control system performs as required by receiving an indication of the actual braking pressure, $P_b$, 30 at the wheel brake 22 as a pressure feedback signal 32. The pressure control algorithm can also be implemented utilizing an estimated pressure at the wheel brake 22 as the pressure feedback signal 32. For example, the feedback signal 32 may be derived from a pressure measured at a location remote from the wheel brake 22 (for example, in a central hydraulic control unit) as modified by an electronic model of the piping between the remote location and the wheel brake 22. The electronic model accounts for transient pressure effects on the fluid supplied to the wheel brake 22 from the remote location.

The functional components present in the current EHB pressure control algorithm include a primary pressure control law 44, described below, which is designed to calculate the demanded flow, $Q_{dem}$ 36 into or out of the wheel brake 22 to achieve a desired braking effect. This is based on the demanded pressure, $P_{cmd}$ 50, supply pressure, $P_s$ 28, and brake pressure, $P_b$ 30 and various gain factors 38, 40, 112. The gain factors are based on gain schedules 42, described below, which are used in the pressure control law 44 to account for non-linearities in the braking system 12. Deadband reduction is also used to minimize the response delay. Finally, switch logic 34 is implemented to determine whether the demanded flow, $Q_{dem}$, 36 at the brake is positive or negative. As a result, the switch logic 34 determines whether voltage will be applied to the apply valve 18 or release valve 26, and whether bulk flow or leakage flow needs to be used.

The first functional component present in the algorithm is the primary control function and is designed to achieve the steady state and dynamic performance requirements in an EHB system 12. To measure the performance of the EHB system 12, a pressure control law 44 is implemented to determine the required inputs and outputs of the system. The inputs to the pressure control law function 44 are filtered demanded brake pressure, $P_{cmd}$ 50, which is the pressure that the algorithm is trying to establish at the brake; measured (or estimated) wheel brake pressure, $P_b$ 30, and measured supply pressure at the pump outlet, $P_s$ 28.

The outputs of the pressure control law function 44 are demanded flow, $Q_{dem}$ 36, and scheduled gain multipliers 1/K 38 and $K_h$ 40. The flow demand $Q_{dem}$ 36 is the commanded flow rate for fluid to flow to or from the wheel brake 22. The scheduled gain multipliers 1/K 38 and $K_h$ 40 are used to modify the demanded flow, $Q_{dem}$ 36 in bulk and leakage flow regions, respectively.

Pressure Control Law/Gain Schedules/Deadband Reduction

Gain schedules 42 are related to the gain factors 38, 40 described above. Gain factors 38, 40 are used to account for non-linearities within the hydraulic system 12. The values that compensate for the non-linearities are established by experimentation and vary for an individual valve, brake caliper or other element in the system or for the system itself. A gain schedule 42 is a table of values for the element based upon certain operating conditions. Depending on the operating conditions at the time a flow is demanded, corresponding gain values 38, 40 from the gain schedule 42 are factored into the pressure control law 44.

The demanded flow, $Q_{dem}$ 36, is computed as a linear function of the pressure demand rate and the error between the demanded pressure, $P_{cmd}$ 50, and the estimated wheel pressure, $P_b$ 30, and represents the flow into or out of the wheel brake 22 (caliper). Two types of gain schedules 42 are used in the pressure control law 44, which allow the use of a linear control signal despite the presence of non-linearities in the system. The primary gain factor, $K_h$ 40, which represents the system hydraulic non-linearity, is intended to compensate for the change in flow gain as a consequence of pressure difference across the valve and the non-linear brake load characteristics. Specifically, $K_h$ 40 is the hydraulic gain factor that accounts for the non-linearity of the pressure versus volume characteristic of the brake caliper 22 and the non-linearity in the throttling of a valve.

The gain factor 1/K 38 considers the overall hardware non-linearity, including the hydraulic non-linearity which is accounted for by $K_h$ 40 as well as additional system non-linearities such as non-linear armature displacement in response to a changing magnetic force applied through the solenoids 19, 27. Preferably, however, only gain factor $K_h$ 40 is used in the leakage flow regions 102, 110 since the change in displacement of the armature in those flow regions is insignificant. Finally, a deadband reduction scheme is used to reduce delays in valve response to an applied voltage when the valve is in its normal position (closed for an apply valve 18, open for a release valve 26).

Another force on the armature comes from the valve seat when the valve (apply valve 18 or release valve 26) is completely closed and acts against the magnetic force. While this force helps reduce the leakage if the valves are supposed to be closed, its presence creates a deadband to the system if the valves are supposed to be opened. If the voltage boundary where the valves are closed and the seat force is zero, then the deadband can be reduced using that value.

The look-up table factors (voltage), which are Voltage Boundary Table1 46 and Voltage Boundary Table2 48, are implemented in the control law 44 to adjust the voltage applied across the valve (apply valve 18 or release 26) based on pre-existing forces on the valve. The look-up tables 46, 48 give the voltages necessary to take the valves from a de-energized state to a just-closed position given the existing pressure differential. The just-closed position is where the valves are closed and the seat force is zero. For the apply valve 18, the pressure differential is established by considering the supply pressure 28 minus the wheel brake pressure 30 ($P_s-P_b$). For the release valve 26, the pressure differential is the same as the wheel brake pressure 30 ($P_b$) because the pressure in the fluid reservoir 14 is zero. The de-energized state for the apply valve 18 is normally closed and the de-energized state for the release valve 26 is normally open. Voltage Boundary Table1 46 supplies the voltage values to be used when a voltage is applied to the apply valve 18 and Voltage Boundary Table2 48 supplies the values respective to the release valve 26. The table values 46, 48 account for pre-load force from a spring connected to the valve armature and the pressure differential force across the valve 18, 26. The table values 46, 48 will be determined based on experimentation and the natural characteristics of a particular valve.

Switch Logic/Bulk and Leakage Flow Control Modes

The EHB system 12 uses two proportional poppet valves, apply valve 18 and release valve 26, as the means of actuation of the brake caliper 22 in the apply and release directions, respectively. The apply valve 18 is used solely for pressure increases and the release valve 26 solely for pressure decreases. Therefore, switch logic 34 is needed to generate two voltage signals, $V_{apply}$ 52 and $V_{dump}$ 54, from one control command. It is also important to distinguish between bulk flow control and a leakage flow control because of the distinct characteristics each possesses, as described above.

The inputs to the switch logic function are, as above, flow demand, $Q_{dem}$ 36; measured/estimated wheel brake pressure, $P_b$ 30; measured supply pressure, $P_s$ 28; scheduled gain multipliers 1/K 38 and $K_h$ 40, and the Voltage Boundary Table1 46 and Table2 48. The outputs of the switch logic function are applied voltages on both the apply valve 18 and release valve 26, $V_{apply}$ 52 and $V_{dump}$ 54. The switch logic function 34 generates actual voltages, $V_{apply}$ 52 and $V_{dump}$ 54, which are applied to the apply-side solenoid 19 and the release-side solenoid 27, respectively.

Figure 2:
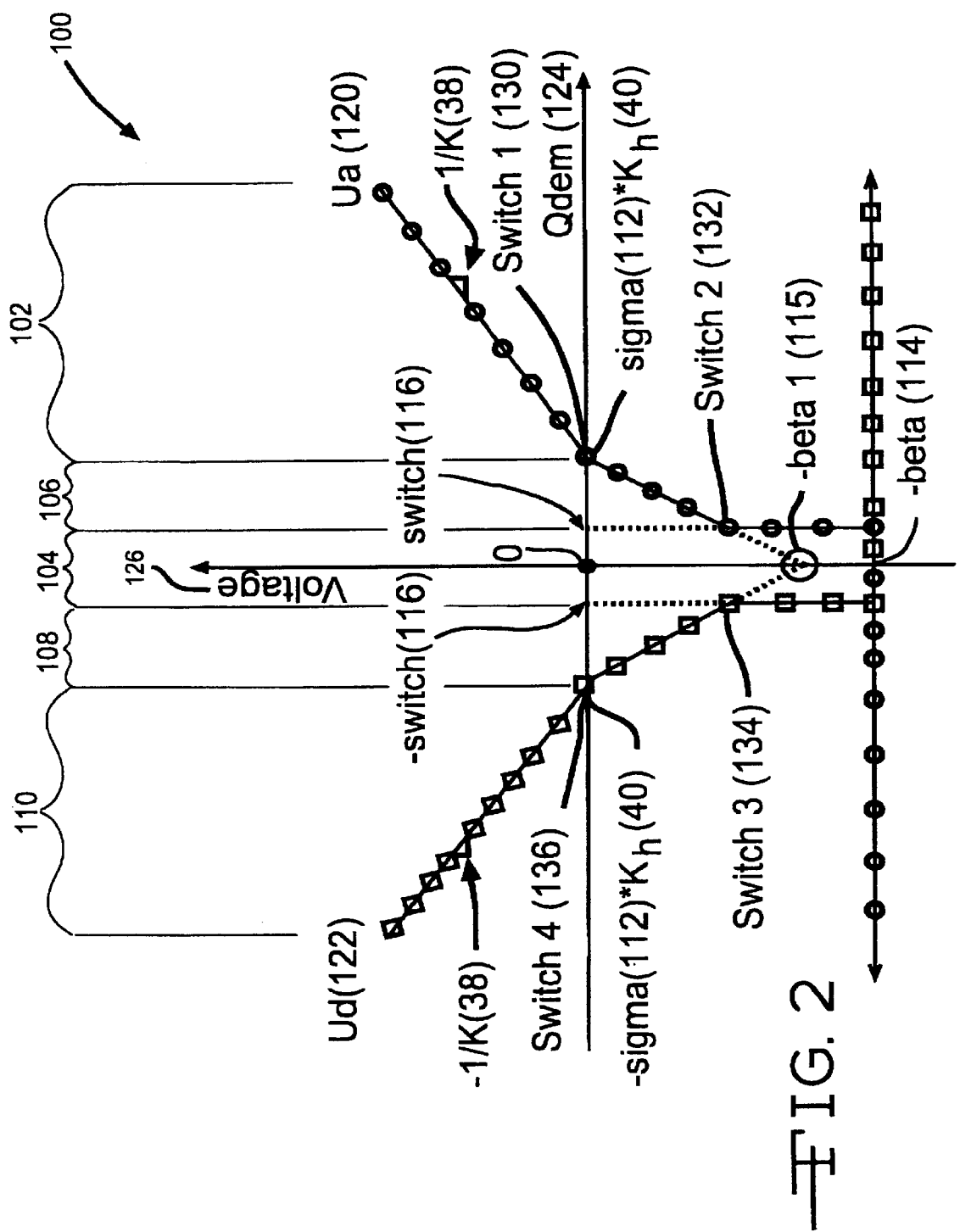
FIG. 2 is a control space partition depicting voltage related to the solenoid, of an apply or release valve, versus the flow demanded through the related valve.

FIG. 2 depicts the control space for operation of the EHB system 12, which has been partitioned into five regions based on switch logic that generates voltages $V_{apply}$ 52 and $V_{dump}$ 54. These regions of control of the EHB system 12 are apply valve bulk flow control 102, apply valve leakage flow control 104, pressure control 106, release valve leakage flow control 108 and release valve bulk flow control 110.

Figure 3:
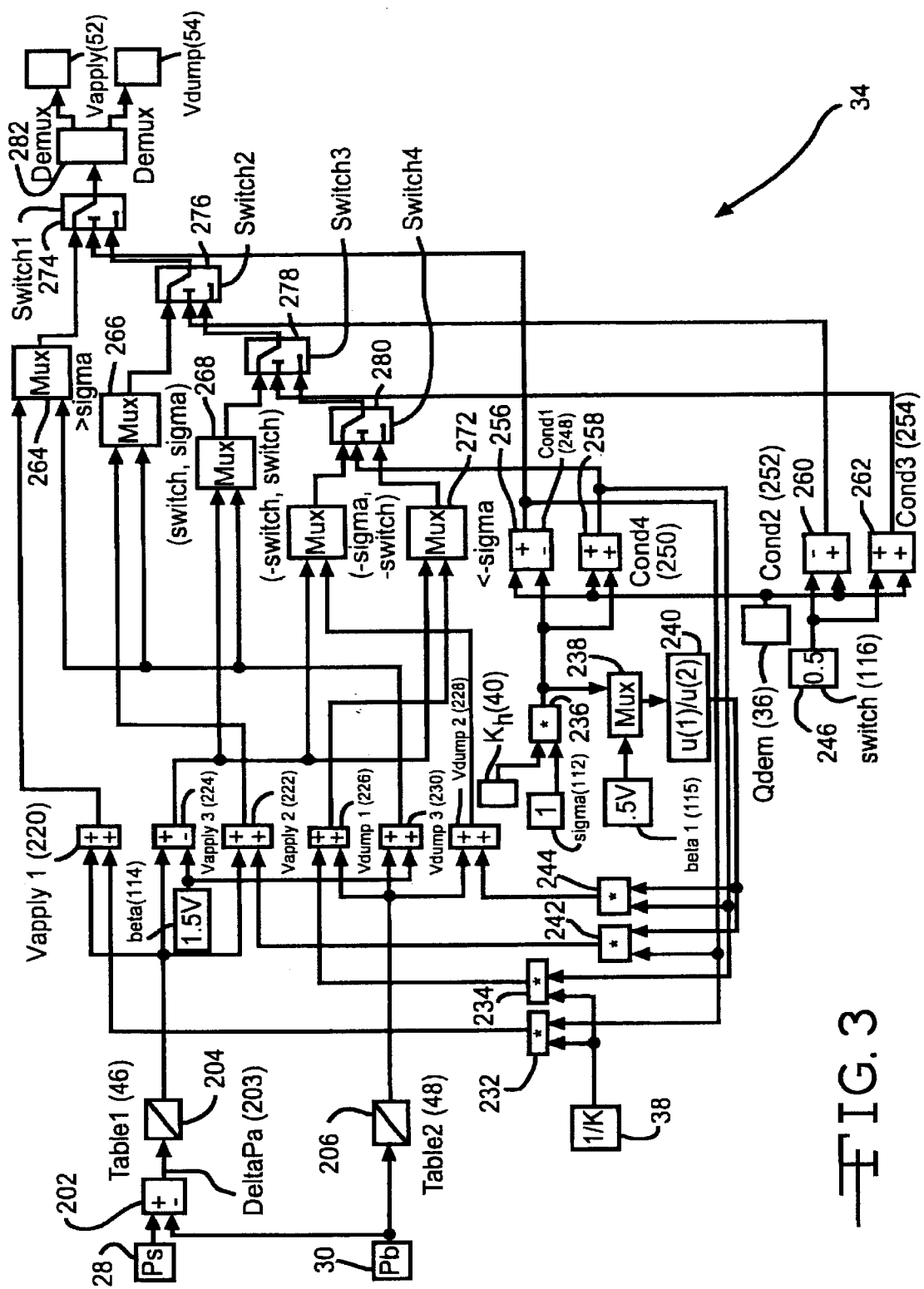
FIG. 3 is a switch logic function schematic of the applied pressure control algorithm.

FIG. 3 indicates how the switch logic 34 develops the voltage ($V_{apply}$ 52) that is applied to the apply valve solenoid 19. FIG. 3 also illustrates how the switch logic 34 develops the voltage ($V_{dump}$ 54) supplied to the release valve solenoid 27. Three modes of control of flow through each of the valves 18 and 26 are described in further detail below. Each region of flow control 102 through 110 has a unique combination of modes of control of the apply valve 18 and release valve 26. Each flow control region also has associated with it a respective $V_{apply}$ 52 and $V_{dump}$ 54 ($V_{apply1}$ 220, $V_{apply2}$ 222, $V_{apply3}$ 224, $V_{dump1}$ 226, $V_{dump2}$ 228, or $V_{dump3}$ 230). The applications of each apply and release voltage 220 through 230 is described below.

A pseudo-code can be developed that defines the functionality of the switch logic function 34 for a normally closed apply valve 18 and a normally open release valve 26. If a point on the axis representing the flow demand 36 (FIG. 2) is positive and is greater than the gain factor $K_h$ 40 multiplied by sigma 112, (Condition1 248), then the EHB system 12 will operate in the apply valve bulk flow region 102 with the apply valve 18 being opened to the desired position. Specifically, the open apply valve 18 in a bulk flow region 102 is operated based on the valve's natural characteristics (including the overall hardware non-linearity), and the hydraulic non-linearity. The function then calculates a respective voltage 52, 54 to be applied to the apply valve 18 and release valve 26 to achieve apply bulk flow and firmly close the release valve 26. Stated in equation form, the voltages for the apply valve 18 and release valve 26 are:

$$V_{apply}=V_{apply1}=\text{Table1}+(Q_{dem}-\text{sigma}*K_h)*(1/K)$$

$$V_{dump}=V_{dump3}=\text{Table2}+\text{beta}$$

Beta 114 is a pre-determined voltage quantity designed to cause the release valve 26 to be firmly closed when a voltage in the amount of beta 114 is applied to it. If the demanded flow 36 is negative and less than the gain factor $K_h$ 40 multiplied by −sigma 112 (Condition4 250), then the valves operate in release bulk flow region 110 with the release valve 26 being opened to the desired position. Represented in equation form, it is the opposite of the previous function.

$$V_{apply}=V_{apply3}=\text{Table1}-\text{beta}$$

$$V_{dump}=V_{dump1}=\text{Table2}+(Q_{dem}+\text{sigma}*K_h)*(1/K)$$

The conditions under which the bulk flow control modes described above will be implemented can be also stated in another manner. If the absolute value of the demanded flow 36 is greater than the absolute value of sigma 112 multiplied by $K_h$ 40, then the apply valve 18 and release valve 26 operate in either the apply valve bulk flow region 102 or the release valve bulk flow region 110. A first valve will be opened to allow bulk flow through it while a second valve is held firmly closed. If the release valve 26 is the second valve, the apply valve 18 and the release valve 26 operate in the apply valve bulk flow region 102. If flow is demanded to the brake 22, then the apply valve 18 is the first valve. If the apply valve 18 is the second valve then the apply valve 18 and release valve 26 are operated in the release valve bulk flow region 110. If flow is demanded away from the brake 22, then the first valve is the release valve 26. This condition, determined by Condition1 248 and Condition4 250, can be set forth in equation form as well:

$$|Q_{dem}|>|\text{sigma}*K_h|$$

If flow is demanded to the brake 22, but the demanded flow is less than sigma 112 multiplied by $K_h$ 40, but greater than switch (evaluated by Condition2 252 and Condition1 248), then the apply valve is operated in apply valve leakage flow region 104, while the release valve is held firmly closed. The opposite remains true here as well. If flow is demanded away from the brake 22 and the value is greater than negative sigma 112 times $K_h$ 40, but less than negative switch 116 (Condition4 250 and Condition3 254), then the release valve 26 is operated in release valve leakage flow region 108 and the apply valve 18 is held firmly closed. Both are represented in equation form as follows. When operating in the apply valve leakage flow control region 104, the voltage applied can be determined by the following equation:

$$V_{apply} = V_{apply2} = Table1 + (Q_{dem} - sigma * K_h) * \frac{beta1}{sigma * K_h}$$

$$V_{dump} = V_{dump3} = Table2 + beta$$

When operating in the release valve leakage flow control region 108, the voltage can be determined by the following equation:

$$V_{apply} = V_{apply3} = Table1 - beta$$

$$V_{dump} = V_{dump2} = Table2 + (Q_{dem} + sigma * K_h) * \frac{beta1}{sigma * K_h}$$

The actuating conditions can be alternatively stated as follows. If the absolute value of the demanded flow 36 is less than the absolute value of sigma 112 multiplied by $K_h$ 40, then a first valve will be controlled in the leakage flow region while a second valve will be held firmly closed. If flow is demanded to the brake 22, then the apply valve 18 will be operated in the leakage flow region 104 and the release valve 26 will be firmly held closed. If flow is demanded away from the brake 22, then the release valve 26 will be operated in leakage control region 108 and the apply valve 18 will be held firmly closed. Similarly, the following equation represents the above condition under which, if satisfied, a leakage control mode will be implemented.

$$|switch| < |Q_{dem}| < |sigma * K_h|$$

If no flow is demanded to or from the brake 22 (determined by Condition3 254) whether or not a braking signal exists, then both the apply 18 and release valves 26 will be firmly held closed and operate in the pressure control region 106. In equation form, The pressure control region is described below.

$$V_{apply} = V_{apply3} = Table1 - beta$$

$$V_{dump} = V_{dump3} = Table2 + beta$$

The condition under which pressure control 106 will operate can also be expressed in a similar form as the conditions above. Satisfaction of the following condition will result in a pressure control mode being applied to the valves.

$$|Q_{dem}| < |switch|$$

Table1 46 and Table2 48 represent "closing boundaries" for the apply valve 18 and the release valve 26, respectively. The closing boundaries are the voltage values at which the apply 18 and release valves 26 are just-closed and there is no extra force on the valve seat. Beta 114, $Beta_1$ 115, sigma 112 and switch 116 are described in greater detail below.

FIG. 2 is a graph illustrating the above pseudo-code in that FIG. 2 graphically depicts the voltage 126 related to the solenoids 19, 27 of the apply valve 18 and the release valve 26 versus the flow demanded 36 through the associated valve. It is important to note that FIG. 2 is for a given wheel brake pressure, $P_b$ 30. Depending on the given pressure, a subsequent pressure demand signal 36 can request an increase or a decrease from that pressure. The horizontal axis depicts the flow demanded 36 by the user of the braking system, presumably the driver of the vehicle. A positive demanded flow, $Q_{dem}$ 36, indicates that flow is demanded towards the brake 22 and a negative flow demand indicates flow is demanded away from the brake 22. The vertical axis depicts voltage 126 related to the respective solenoids 19, 27 to open or firmly hold closed the apply 18 or release valves 26.

The apply valve voltage curve, $U_a$ 120, depicts the voltage 126 versus 434 demanded flow 36 for the apply valve 18 and the release valve voltage curve, $U_d$ 122, represents the voltage 126 versus demanded flow 36 for the release valve 26. Both curves represent voltages relative to the "closing boundaries" in the following way:

$$V_{apply} = Table1 + U_a$$

$$V_{dump} = Table2 - U_d$$

The Table1 46 value is a voltage that will move the valve armature to a just-closed position. Because the apply valve 18 is normally closed, $U_a$ needs to be added to Table1 46. The three regions of valve operation—bulk flow 102, leakage flow 104 and pressure control 106—on the flow demand versus voltage curve of FIG. 2 is based on "closing boundary" denoted by Table1 46. The Table2 48 value is a voltage that will move the valve armature to a just closed position as well. Because the release valve 26 is normally open, $U_d$ needs to be subtracted from Table2 48. The three regions of operation—bulk flow 110, leakage flow 108 and pressure control 106—on the flow versus demand curve depicted in FIG. 2, are based on "closing boundary" denoted by Table2 48.

Sigma 112 is a constant used as a leakage gain factor, described above. Sigma 112 calibrates the control law 44 to the leakage characteristics of the installed type of valve to match the slope of the flow versus the change in current curve. For example, depending on the valve used, if leakage is high, then a high sigma 112 value is used to compensate, whereas if there is low leakage flow, a low sigma 112 value is used. If there is no leakage, then sigma 112 will be zero. On the apply valve voltage curve 120 and release valve voltage curve 122, the slopes of the curves in their respective bulk control regions 102, 110 are gain factors 1/K 38 and –1/K 38.

The demanded flow 36, and its positive or negative value, is chosen as the selector of the switch logic 34 so that a uniform non-control band can be achieved with respect to pressure error. Use of a so-called non-control band is intended to eliminate valve chattering caused by system noise.

When the demanded flow 36 falls in some neighborhood of zero, the valve can chatter which is deemed to result entirely from noise in the system resulting in both valves varying from a closed to slightly unclosed position rapidly. This is where a first voltage quantity, beta 114, becomes relevant. The beta 114 value is the magnitude of the minimum additional voltage required to firmly close the valve, depending on individual valve characteristics, to eliminate leakage. This first voltage quantity, beta 114, is determined experimentally based on individual valve properties. The value of beta 114 can also be determined as a function of the pressure differential across a valve. For an apply valve 18, the pressure differential is between the supply pressure, $P_s$ 28, and the brake pressure, $P_b$ 30. For a release valve 26, the pressure differential is simply $P_b$ 30. A second voltage quantity, $beta_1$ 115, is less than or is equal to the first voltage quantity, beta 114, and is used to set the slope of the apply valve voltage curve, $U_a$ 120, and the release valve voltage curve, $U_d$ 122, in their respective leakage flow regions 104, 108. $Beta_1$ 115 is f the additional voltage applied to a just-closed valve to reduce leakage flow to a level from which leakage is utilized to modulate brake pressure. $Beta_1$ 115 can also be determined as a function of the pressure differential across a valve. For an apply valve 18, the pressure differential is between the supply pressure, $P_s$ 28, and the brake pressure, $P_b$ 30. For a release valve 26, the pressure differential is simply $P_b$ 30. As can also be seen in the $U_a$ 120 and $U_d$ 122 equations, above, is that when the valves 18, 26 are held firmly closed, beta 114 will be subtracted from Table1 46 and added to Table2 48, such that beta 114 moves the valve armature into a firmly closed position from a just-closed position.

The set value of beta 114 and $beta_1$ 115 can be the same or different. However, from a physical standpoint, by adding a second voltage quantity, $beta_1$ 115, (see FIG. 3) there can be a lesser value for holding a valve shut when it may be desired to have some usable leakage flow while holding the valve shut to help the driver moderate pressures. For example setting the second voltage quantity, $beta_1$ 115, to 0.5V (which allows some leakage to occur) and the first voltage quantity, beta 114, to 1.5V (where the valve is held firmly shut with essentially no leakage) allows for this control scheme. The voltage values used in this example are not meant to limit the voltage values that can be used for beta 114 and $beta_1$ 115 in terms of magnitude and/or proportion, and are used for example only. This example, with $beta_1$ 115 at 0.5V and beta 114 at 1.5V, is also shown in FIGS. 3–8. However the voltage values are only shown in the drawings as exemplary of values that can be used and should not be construed to limit the values at which $beta_1$ 115 and beta 114 can be fixed. Additionally, voltage quantities $beta_1$ 115 and beta 114 can have different values for an apply valve and a release valve, and can also be a function of pressure differential across a valve.

Switch positions 116 on the apply and release voltage curves 120, 122 depict threshold points set to avoid a response to noise in the EHB system 10. Switch 116 is the magnitude of the demanded flow signal 36 below which the first voltage quantity, beta 114, is applied to the valve. Application of the first voltage quantity, beta 114, to the valve will firmly close the valve so that there will be no response to minor variations in the signal. As the differential pressure increases (for a normally open valve), the voltage at which a position on the release voltage curve, $U_d$ 122, equals its Table2 value 48 increases. As the pressure differential decreases, the voltage at which a position of the release valve voltage curve 122 equals its Table2 value 48 decreases. The converse is true for a normally closed valve. As described above, the Table values 46, 48 are look-up values implemented in the control law 44 to adjust the voltage applied across the valve based on pre-existing forces on the valve.

FIG. 3 illustrates the switch logic function and depicts the switch logic function schematic of the applied pressure control algorithm 34 for each of the flow control regions 102, 104, 106, 108, 110. FIGS. 4–8 show the switch logic function for each individual control state. However, what is shown is only the ultimate signal flow after the signal has been processed through each comparator 256, 258, 260, 262. In actual application of the algorithm, signals will be evaluated at every stage of the schematic as shown in FIG. 3. Only the applicable signals will pass through each comparator, addition or multiplication box and output a resultant voltage. Measured supply pressure, $P_s$ 28, and measured (or estimated) wheel pressure, $P_b$ 30, are used to determine the pressure differential, delta $P_a$ 203 across the apply valve 18. The resultant pressure differential is input to valve closing boundary Table1 46 for the apply valve 18. The wheel pressure, $P_b$ 30 is input to Table2 48, for the release valve 26. The demanded flow, $Q_{dem}$ 36 and gain factors sigma 112, $K_h$ 40 and voltage quantity, $beta_1$ 115 are also factored together, multiplied by scheduled gain factor 1/K 38 and combined with the proper Table value 46, 48. This signal then continues to one of the valve position voltage schemes, $V_{apply1}$ 220, $V_{apply2}$ 222, $V_{apply3}$ 224, $V_{dump1}$ 226, $V_{dump2}$ 228 or $V_{dump3}$ 230 corresponding with the proper flow control mode. The routing of the signals to the proper schematic location corresponds to processing the voltage position on the apply 18 or release valve 26 voltage curves. $V_{apply1}$ 220 or $V_{dump1}$ 226 correspond to the upper region of the curves (indicating Bulk Flow—apply 102,—release 110), $V_{apply}$ 222 or $V_{dump2}$ 228 corresponds to the mid-region (indicating Leakage Flow—apply 104,—release 108) and $V_{apply3}$ 224 or $V_{dump3}$ 230 corresponds to the base region (Pressure Control 106). The signals then are modified according to the algorithm respective to whether Leakage Flow, Bulk Flow or Pressure Control is the goal. Finally, the signal moves through the appropriate Switch (274, 276, 278, 280) to determine the output voltage.

A signal dependent upon Condition1 248, Condition2 252, Condition3 254 or Condition4 250 is also determined from the combination of sigma 112, $K_h$ 40, $beta_1$ 115 and $Q_{dem}$ 36. Satisfaction of Condition1 through Condition4 (248, 250, 252, 254), described above in the pseudo-code, determines whether to actuate one of the following control models: Bulk Flow Control for the apply 18 or release 26 valves, Leakage Flow Control for the apply 18 or release 26 valve, or Pressure Control. Only four Conditions are listed above, but five flow control models exist because the bulk flow control mode for the release valve 26 is operated as the default condition if the other conditions are not satisfied. This is due to the release valve 26 being normally held open and the apply valve 18 normally being held closed. Whether a Condition is satisfied determines whether switching functions, Switch1 274, Switch2 276, Switch3 278 or Switch4 280, are in a positive or negative mode. If the signal is positive, then the primary signal is selected and moves through the switch. If the signal is negative, then the secondary signal moves through the switch.

The signals from $V_{apply1}$ 220, $V_{apply2}$ 222, $V_{apply3}$ 224, $V_{dump1}$ 226, $V_{dump2}$ 228 or $V_{dump3}$ 230 proceed next through the proper switch depending on the satisfaction of Condition1 through Condition4 (248, 250, 252, 254). These Conditions are designed to serve as signals to determine whether there is a positive or negative signal going through the switches (274, 276, 278, 280). FIGS. 4–8 schematically represent the signal flow through the system for each of the flow control modes, however it should be understood that the signal will be processed during every braking operation through each Condition box and each Switch. Only the proper signal will pass to result in an output voltage. Ultimately, the signal is output, based on the above values, and actuates the apply 18 and release 26 valves in the proportion demanded by the braking system to deliver the demanded braking pressure to the wheel brake 22. It should be understood that this operation also applies to vehicles having multiple wheels and to the apply 18 and release valves 26 for each wheel brake 22 in the system.

Figure 4:
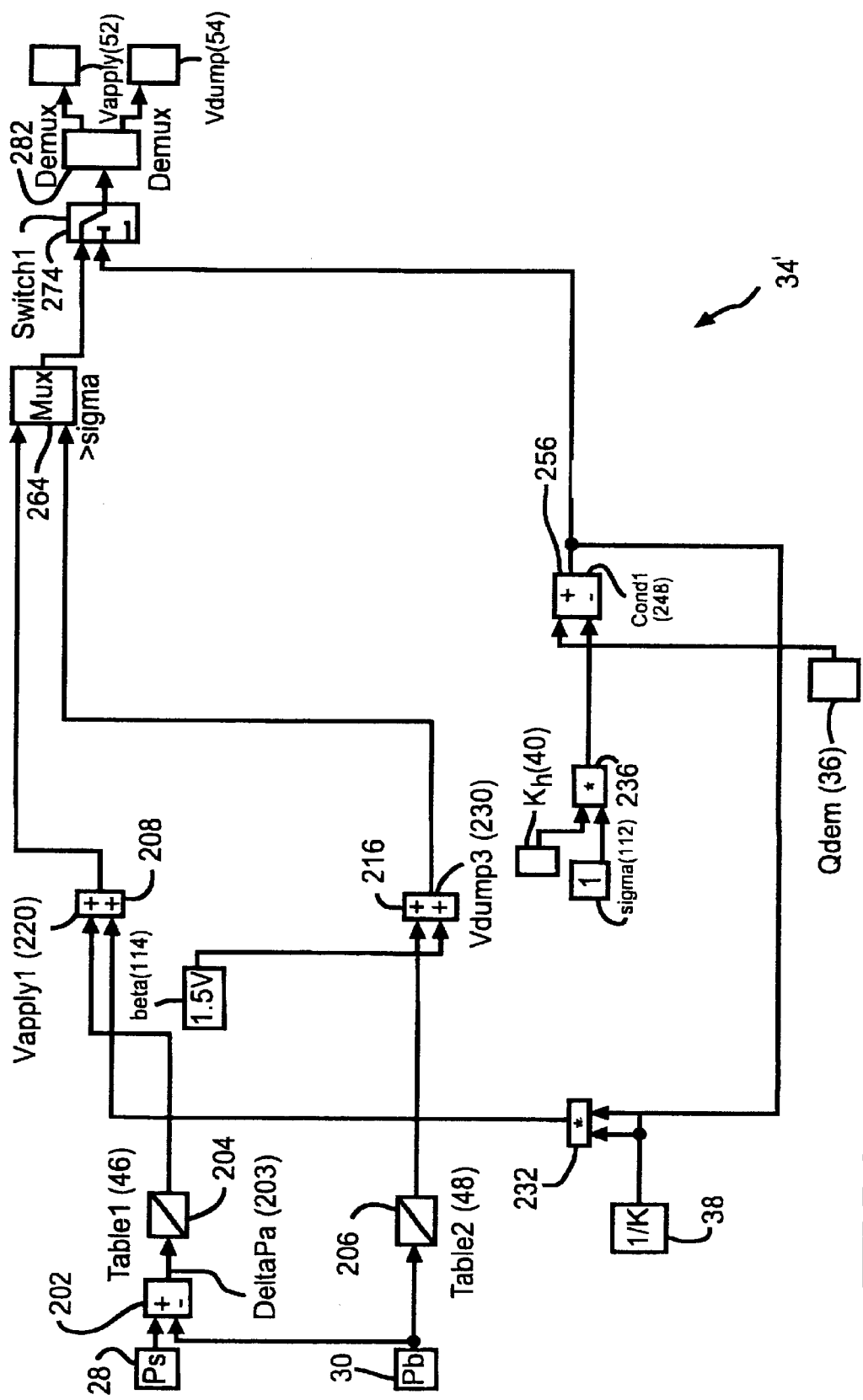
FIG. 4 is a switch logic function schematic of the applied pressure control algorithm showing the signal path for operating the apply valve in the bulk flow control region and holding the release valve firmly closed.

The switch process, as explained above, allows a signal to pass through each Switch during every braking operation. However, each Switch allows a signal to pass based on satisfaction of a Condition. The Conditions used herein compare the relative values of the demanded flow value, $Q_{dem}$ 36, to gain factors, sigma 112 times $K_h$ 40, and switch 116 as described above in the pseudo-code. This process is described starting with Switch1 274. A primary signal, described with FIG. 4, is processed from multiplexer 264 comprising the outputs of adder boxes 208 and 216, resulting in $V_{apply1}$ 220 and $V_{dump3}$ 230. A signal from comparator 256, described below, also enters Switch1 274. If Condition1 248 is satisfied, indicating that the demanded flow, $Q_{dem}$ 36 is greater than sigma times $K_h$ and $Q_{dem}$ is greater than zero, the signal is positive representing that the apply valve 18 will be operated in the bulk flow control region. In such a case, the signal from multiplexer 264 passes through the Switch1 274, is de-multiplexed 282, and a $V_{apply}$ 52 and $V_{dump}$ 54 voltage is output. If Condition1 248 is not satisfied, indicating that the demanded flow, $Q_{dem}$ 36, is any other value, the signal is negative indicating that a control mode other than a bulk flow control mode for the apply valve 18 is to be activated. In that case, a secondary signal is read from the output of Switch2 276 and that signal passes through Switch1 274, is de-multiplexed 282 and outputs $V_{apply}$ 52 and $V_{dump}$ 54.

The output of Switch2 276 is similarly determined. A primary signal enters Switch2 276 from multiplexer 266 with the signal output from adder boxes 212 and 216 representing $V_{apply2}$ 222 and $V_{dump3}$ 230. A signal from comparator 260, determining if the demanded flow 36 in relation to Condition2 252, described below, is met. That signal also enters Switch2 276. If Condition2 252 is satisfied, then the signal proceeds to Switch1 274 and is assessed to determine if Condition1 248 is also satisfied. Satisfaction of Condition1 248 and Condition2 252, for purposes of applying the leakage flow control model, is to determine whether $Q_{dem}$ 36 is between switch 116 and sigma 112 times $K_h$ 40. If so, a positive value of $Q_{dem}$ 36 represents that the apply valve 18 will be operated in the leakage flow control region. The signal from multiplexer 266 then passes through Switch2 276, Switch1 274 and is de-multiplexed through de-multiplexer 282 to produce the voltages $V_{apply}$ 52 and $V_{dump}$ 54. If Condition2 252 is satisfied but Condition1 248 is not satisfied, then the control system will operate in the bulk flow control region as described above. If both Condition2 252 and Condition1 248 are not satisfied, indicating that $Q_{dem}$ 36 is less than or equal to switch 116, then the signal at Switch2 276 is negative. When the signal at Switch2 276 is negative, a flow control mode for the apply valve 18 is a flow mode other than leakage flow or bulk flow. In such a case, a secondary signal is read from the output of Switch3 278 and that signal passes through Switch2 276 and Switch1 274, is de-multiplexed 282 and outputs $V_{apply}$ 52 and $V_{dump}$ 54.

The output of Switch3 278 is also determined in a similar manner. A primary signal enters Switch3 278 from multiplexer 268 with the signal output from adder box 210 and 216 representing $V_{apply3}$ 224 and $V_{dump3}$ 230. A signal from Condition3 254, described below, also enters Switch3 278. If Condition3 254 is satisfied, indicating that $Q_{dem}$ 36 is between negative switch 116 and positive switch 116, then the signal is positive representing that the valves operate in a pressure control mode is to be activated. In such a case, the signal from multiplexer 268 passes through Switch3 278, Switch2 276, Switch1 274 and is de-multiplexed 282 and $V_{apply}$ 52 and $V_{dump}$ 54 are output. If Condition3 254 is not satisfied, indicating that $Q_{dem}$ 36 is any other value less than negative switch, a secondary signal is read from the output of Switch4 280 and that signal passes through Switch3 278, Switch2 276 and Switch1 274, is de-multiplexed 282 and outputs $V_{apply}$ 52 and $V_{dump}$ 54. If $Q_{dem}$ 36 is greater than positive switch 116, the signal is processed through Switch2 276 and Switch1 274 as described above.

The output of Switch4 280 is similarly determined. A primary signal enters Switch4 280 from multiplexer 270 with the signal output from adder box 210 and 218 representing $V_{apply3}$ 224 and $V_{dump2}$ 228. A signal from Condition4 250, described below, also enters Switch4 280. If Condition4 250 is satisfied, indicating that $Q_{dem}$ 36 is greater than negative sigma 112 times $K_h$ 40, then a positive value representing the release valve 26 will operate in the leakage flow region, then the signal from multiplexer 270 passes through Switch4 280 to Switch3 278. At Switch3 278, the signal is evaluated against Condition3 254 to determine if $Q_{dem}$ 36 is less than negative switch 116. If both Condition3 254 and Condition4 250 are met such that the demanded flow 36 is between negative switch 116 and negative sigma 112 times $K_h$ 40, then the signal proceeds through Switch2 276, Switch1 274, is de-multiplexed 282 and a $V_{apply}$ 52 and $V_{dump}$ 54 voltage is output in leakage flow control mode applied to the release valve 26. If Condition4 250 and Condition3 254 are not satisfied, a secondary signal is read from the output of Switch4 280 to determine whether the demanded flow is less than negative sigma 112, which is the default position with the release valve open and apply valve held closed. That signal then passes through Switch 3 278, Switch2 276 and Switch1 274, is de-multiplexed 282 and outputs $V_{apply}$ 52 and $V_{dump}$ 54 in a bulk flow control mode applied to the release valve 26. If Condition4 250 is satisfied, but Condition3 254 is not, then as the signal goes through Switch3 278, Switch2 276 and Switch1 274 there is a comparison to determine if the preceding conditions are satisfied, as described above.

Shown in FIG. 4 is the switch logic function schematic 34' of the applied pressure control algorithm processing a signal to operate the apply valve 18 in a bulk flow control region while holding the release valve 26 firmly closed. Initially, the vehicle operator requests a demanded flow, $Q_{dem}$ 36, by applying or releasing a brake pedal (not shown). A signal detecting this demand travels to comparator 256 and Condition1 248 is applied, determining the relative values of demanded flow, $Q_{dem}$ 36 to sigma 112 multiplied by $K_h$ 40. The signal leaving comparator 256 is multiplied by 1/K 38 and is added under condition $V_{apply1}$ 220 through adder box 208 to a signal representing the current pressure in the system. The current system pressure is determined by calculating the supply pressure, $P_s$ 28 minus the brake pressure, $P_b$ 30, defining a pressure differential, delta $P_a$ 203. The signal next proceeds to box 204 where it is factored with the Table1 46 value for the apply valve 18 signal. That signal also proceeds to adder box 208 and is added to the flow demand 36 signal described above. The brake pressure signal also travels a separate route, factored with Table2 48 for the release valve 26 and to adder box 216, representing $V_{dump3}$ 230. That signal is also added to beta 114. Both pressure signals are multiplexed 264 and proceed to Switch1 274 and are evaluated as described above. The output of Switch1 274 is de-multiplexed and outputs $V_{apply}$ 52 and $V_{dump}$ 54. To reiterate, $V_{apply1}$ 220 represents the apply valve in a bulk flow region, $V_{dump3}$ 230 represents the release valve in a closed position with the additional beta value 114 (voltage factor) present to ensure that the valve 26 is held firmly closed.

Figure 5:
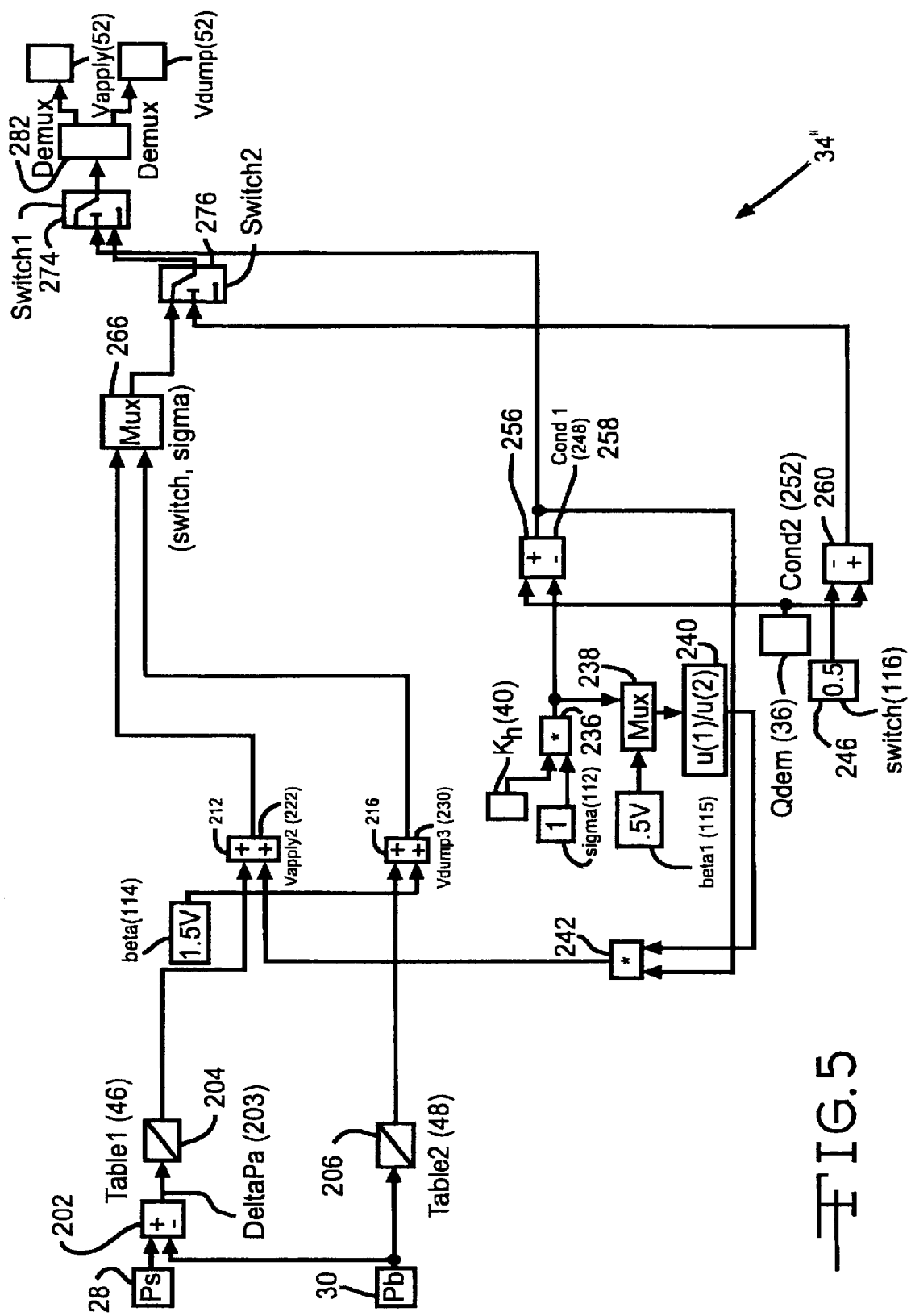
FIG. 5 is a switch logic function schematic of the applied pressure control algorithm showing the signal path for operating the apply valve in the leakage flow control region and holding the release valve firmly closed.

FIG. 5 shows the switch logic function schematic 34″ of the applied pressure control algorithm processing a signal to operate the apply valve 18 in a leakage flow control region while holding the release valve 26 firmly closed. Initially, the operator of the vehicle demands a flow by applying or releasing the brake pedal. This signal travels in two directions. First, it is evaluated relative to Condition2 252 at comparator 260. It is there determined whether the demanded flow, $Q_{dem}$ 36 is greater or less than the switch 116 value. The signal then proceeds to Switch2 276 and is processed as described above. The demanded flow, $Q_{dem}$ 36, signal also travels to comparator 256. There, the gain factor signal is compared thereto. Gain factor $K_h$ 40 is multiplied by sigma 112 and sends a signal to comparator 256 and is compared to the demanded flow, $Q_{dem}$ 36. That signal then moves to Switch1 274 as described above. The gain factor signals (sigma*$K_h$) is divided by $beta_1$ 115 and then proceeds to multiplication box 242 where it is factored with the output of adder box 256. The combined signal then moves to adder box 212 representing $V_{apply2}$ 222. There, as above, it is added to the pressure differential signal, delta $P_a$ 203. The pressure differential signal, delta $P_a$ 203, is again factored through Table1 46, but proceeds to adder box 212. The signal from the brake pressure proceeds as above to adder box 216, and is added to $beta_1$ 115, as the release valve 26 remains firmly closed. The signal from 212 and 216 are multiplexed 266 and proceed to Switch2 276, where they are processed and proceed as described above. The output signal from Switch1 274 then is de-multiplexed 282 and is the voltage ($V_{apply}$ 52 and $V_{dump}$ 54) applied to the apply 18 and release 26 valves, controlling the apply valve 18 in a leakage flow control region while holding the release valve 26 firmly closed.

Figure 6:
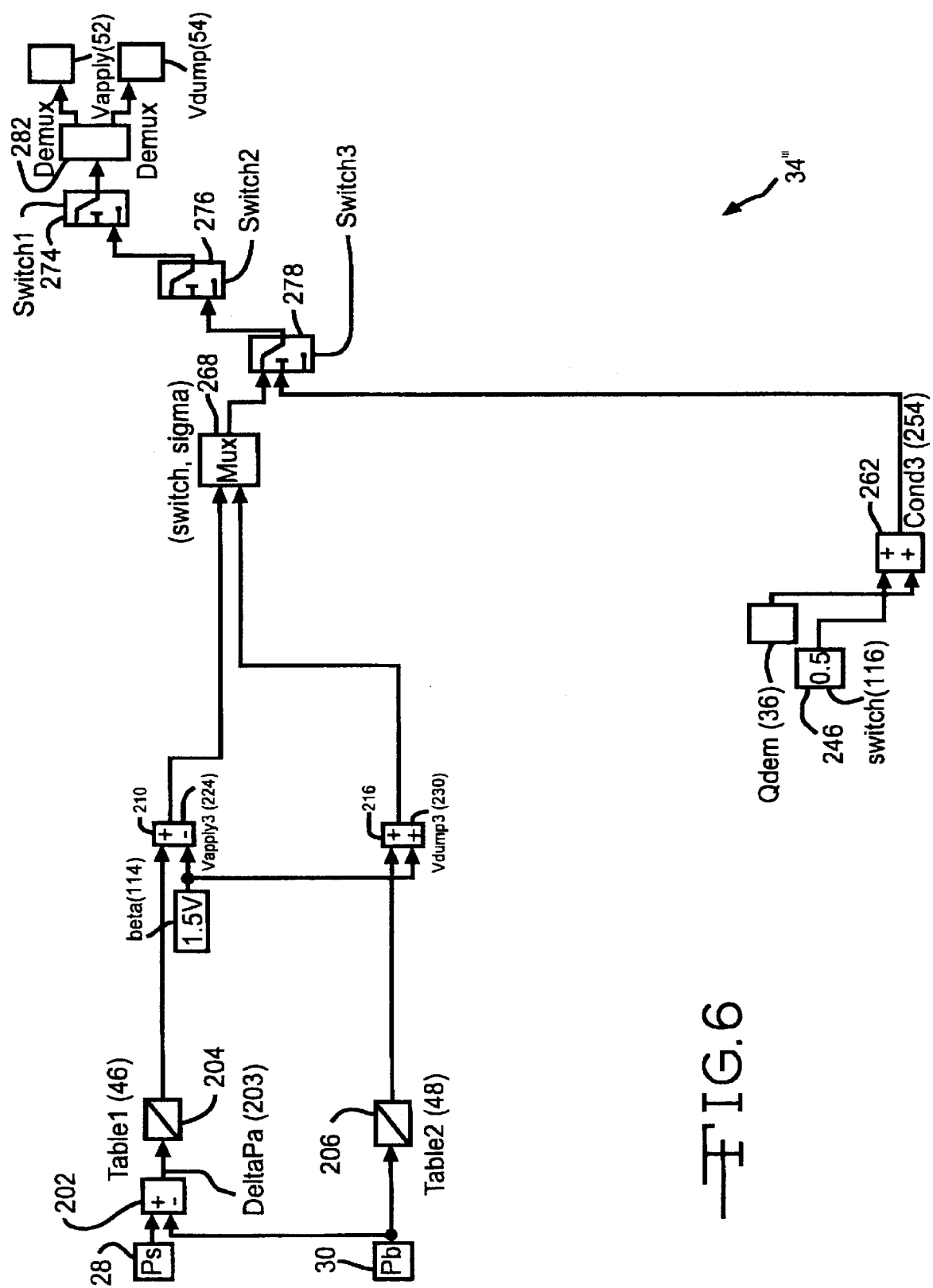
FIG. 6 is a switch logic function schematic of the applied pressure control algorithm showing the signal path for operating the apply valve and the release valve in the pressure control region holding both valves firmly closed.

As seen in FIG. 6, the switch logic function schematic 34‴ of the applied pressure control algorithm processing a signal to hold the apply 18 and release 26 valves firmly closed. Initially, the operator of the vehicle initiates a signal demanding no flow by not applying or releasing the brake pedal. This signal travels to comparator 262 under Condition3 254 and is checked relative to switch 116. The signal then proceeds to Switch3 278 where it is evaluated as described above. As above, the pressure differential, delta $P_a$ 203, is determined and in this case will result in there being no pressure differential. Therefore, a first signal proceeds to adder box 210 representing $V_{apply3}$ 224 and is added to beta 114. The beta value 114 is used to hold the valves firmly closed. The signal then proceeds to Switch3 278 where it is processed with a signal from adder box 216. The brake pressure, $P_b$ 30 is processed through Table2 48 and is added to beta 114 in adder box 216 representing $V_{dump3}$ 230 indicating the valve is held firmly closed. The signals are multiplexed 268, and proceed to Switch3 278 and are evaluated and proceed as described above. The output of Switch1 274 ultimately is de-multiplexed 282 and outputs $V_{apply}$ 52 and $V_{dump}$ 54, both being voltages to hold the valves firmly closed.

Figure 7:
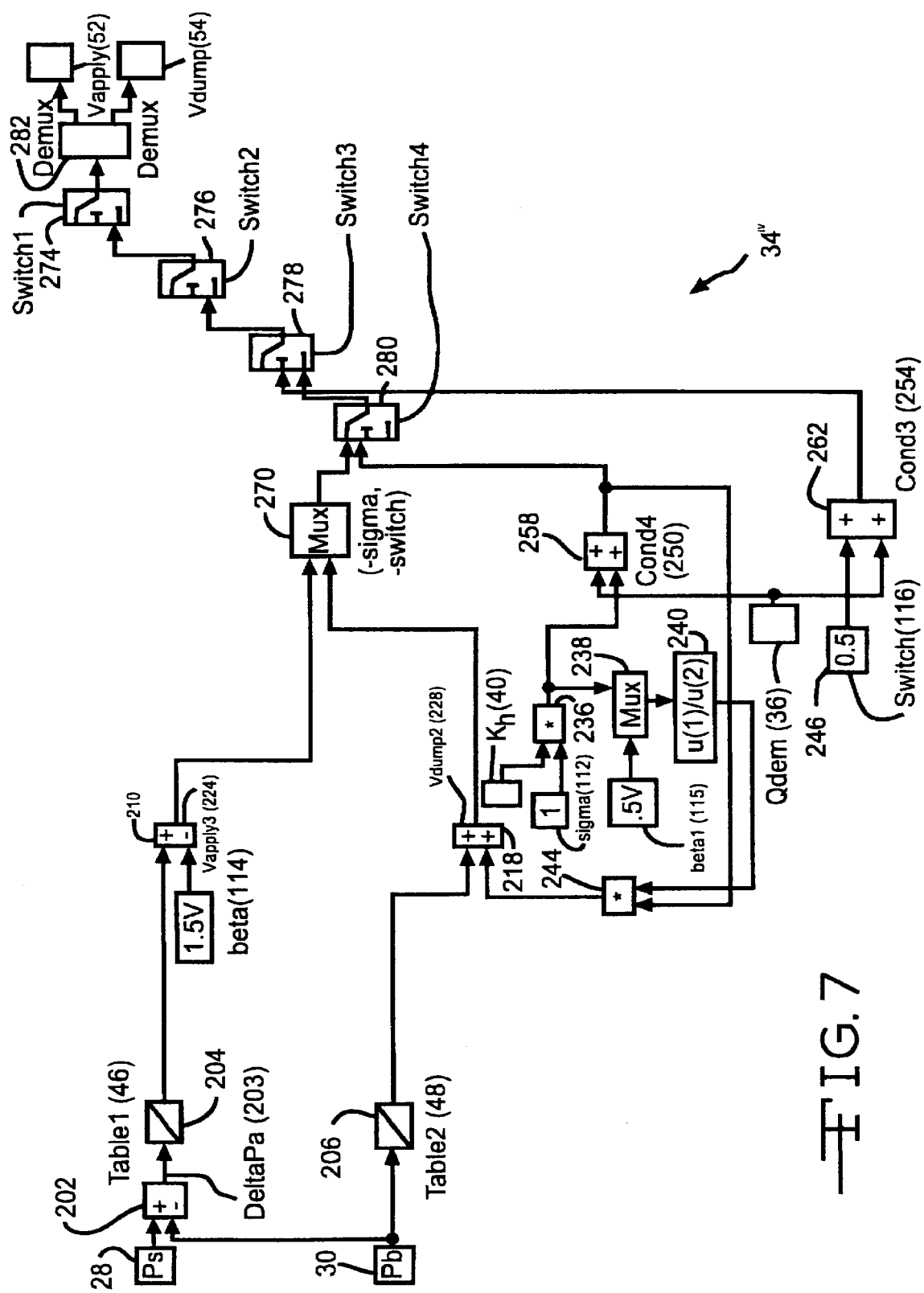
FIG. 7 is a switch logic function schematic of the applied pressure control algorithm showing the signal path for operating the release valve in the leakage flow control region and holding the apply valve firmly closed.

Illustrated in FIG. 7 is the switch logic function schematic $34^{iv}$ of the applied pressure control algorithm processing a signal to operate the release valve 26 in a leakage flow control region while holding the apply valve 18 firmly closed. Initially, a flow is demanded by the operator of the vehicle by applying or releasing the brake pedal. This signal travels to comparator 258 representing Condition4 250. There the flow demand 36 signal is compared to a gain factor signal. The gain factor signal is a combination of sigma 112 and $K_h$ 40 after it is processed through multiplication box 236. The demanded flow is added to sigma 112 times $K_h$ 40 and is split in two direction ($Q_{dem}$+(sigma*$K_h$)). One such signal proceeds to Switch4 280. The flow demand 36 is also compared under Condition3 254 relative to switch 116 and proceeds toSwitch3 278. The other proceeds to multiplication box 244. The sigma 112 times $K_h$ 40 signal is also processed with $beta_1$ 115 through division box 240. The combined signal then proceeds to multiplication box 244. The output of 244 [$(Q_{em}$+sigma*$K_h)(beta_1/(sigma*K_h))$] proceeds to adder box 218 representing $V_{dump2}$ 228 which is the release valve leakage flow region. The other factor entering 218 is the Table2 48 processed brake pressure signal, $P_b$ 30. The sum of those two signals proceeds to Switch4 280 in combination with the signal from 210. The apply valve 18 is held firmly closed, as dictated by $V_{apply3}$ 224. Adder box 210 outputs the sum of the supply pressure, $P_s$ 28 through its Table1 46 processing and beta 114. The signals from 210 and 218 are multiplexed 270 and proceed to Switch4 280 where they are processed as described above with the signal from 258. From there the signal goes through Switch3 278, Switch2 276 and Switch1 274 where it is de-multiplexed 282 and finally output as $V_{apply}$ 52 and $V_{dump}$ 54, controlling the release valve 26 in a leakage flow control region and applying a voltage to hold the apply valve 18 firmly closed.

Figure 8:
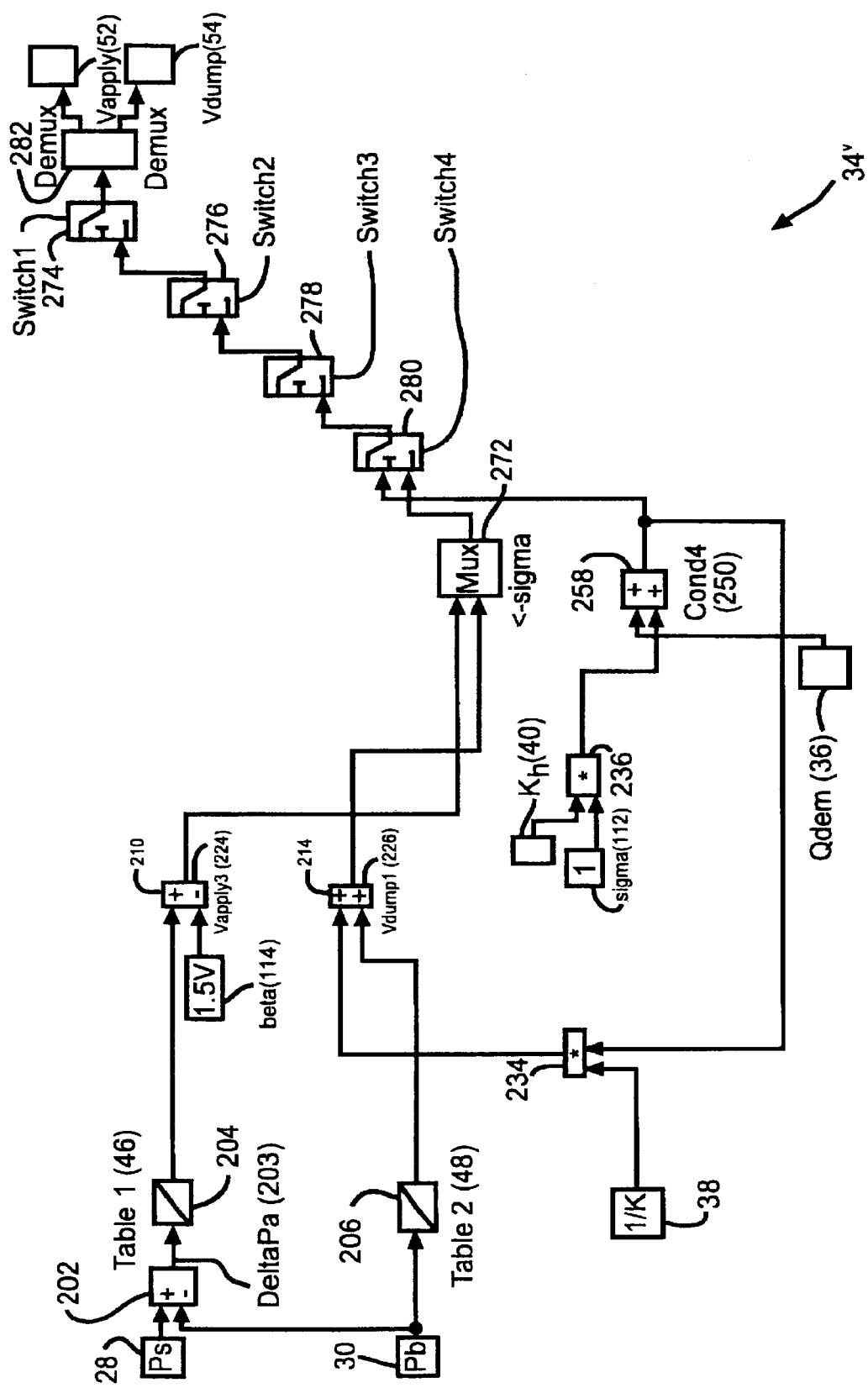
FIG. 8 is a switch logic function schematic of the applied pressure control algorithm showing the signal path for operating the release valve in the bulk flow control region and holding the apply valve firmly closed.

As shown in FIG. 8 is the switch logic function schematic $34_v$ of the applied pressure control algorithm processing a signal to operate the release valve 26 in a bulk flow mode while holding the apply valve 18 firmly closed. Initially, the operator of the vehicle demands a flow by applying or releasing the brake pedal. The signal proceeds through comparator 258 representing Condition4 250 with a gain factor signal of sigma 112 multiplied by $K_h$ 40 through 236. The output of 258 is split and travels to Switch4 280 as well as multiplication box 234. At 234, it is combined with gain factor 1/K 38. The output of 234 is added to the brake pressure signal, $P_b$ 30, processed through Table2 48, at adder box 214. $V_{dump2}$ 226, at adder box 214, represents the release valve bulk flow region 110. The signal is multiplexed 272 then proceeds to Switch4 280. A pressure differential signal, delta $P_a$ 203, processed through Table1 46, is further processed through 210 with beta 114. The output of 210 also is multiplexed 272 and proceeds to Switch4 280, where it is processed with signals from 214 and 258. The output of Switch1 274 is de-multiplexed 282 and represent $V_{apply}$ 52 and $V_{dump}$ 54, where $V_{apply}$ 52 is a voltage to hold the apply valve 18 firmly closed.

Various signals are shown in FIGS. 3–8 as being multiplexed and de-multiplexed. It should be understood that the depiction of the signal in such a manner is done for purposes of simplicity in the figures only. The actual signals need not be multiplexed or de-multiplexed while being processed.

The preferred embodiment can be described as the operation of a control algorithm in an EHB system. It should be understood that this method can be used in any electronically controlled braking system. This includes a conventional system where the base-braking function is controlled in a conventional manner by a user actuating a brake pedal thereby operating a master cylinder to operate base braking under normal, no-slip braking conditions. The conventional system would also implement a conventional ABS system to control braking only under wheel-slip conditions or where electronic braking operates during specified special situations (i.e. traction control, vehicle stability control, etc.).

It should be further understood the invention can be used to control pressure in other vehicular and non-vehicular hydraulic systems using at least one poppet valve for controlling the application of pressurized hydraulic fluid to a hydraulic load or one poppet valve for controlling the relief of pressurized hydraulic fluid from a hydraulic load to a lower pressure portion of the hydraulic system.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. In an EHB system where pressure in a brake is controlled by the combined action of a first valve and a second valve, a method of controlling the voltage applied to the first valve and the second valve comprising:
    a) controlling the first valve using a bulk flow mode when $|Q_{dem}|>|sigma*K_h|$, and holding the second valve firmly closed; and
    b) controlling the first valve using a leakage control mode when $|switch|<|Q_{dem}|<|sigma*K_h|$, and holding the second valve firmly closed;
wherein $Q_{dem}$ is a demanded low, sigma is a leakage gain factor, $K_h$ is a hydraulic gain factor, and switch is a threshold demanded flow constant at and below which a constant voltage is applied lo each of the valves.

2. In an EHB system where pressure in a brake is controlled by the combined action of a First valve and a second valve, a method of controlling the voltage applied to the first valve and the second valve comprising:
    a) controlling the first valve using a bulk flow mode when $|Q_{dem}|>|sigma*K_h|$, and holding the second valve firmly closed; and
    b) controlling the second valve using a leakage control mode when $|switch|<|Q_{dem}|<|sigma*K_h|$, and holding the first valve firmly closed;
wherein $Q_{dem}$ is a demanded flow, sigma is a leakage gain factor, $K_h$ is a hydraulic gain factor, and switch is a threshold demanded flow constant at and below which a constant voltage is applied to each of the valves.

3. In an EHB system where pressure in a brake is controlled by the combined action of a first valve and a second valve, a method of controlling the voltage applied to the first valve and the second valve comprising:
    a) controlling the first valve using a leakage control mode when $|switch|<|Q_{dem}|<|sigma*K_h|$, and holding the second valve firmly closed; and
    b) controlling the first valve and the second valve using a pressure control mode when $|Q_{dem}|<|switch|$, holding both said valves firmly closed;
wherein $Q_{dem}$ is a demanded flow, sigma is a leakage gain factor, $K_h$ is a hydraulic gain factor, and switch is a threshold demanded flow constant at and below which a constant voltage is applied to each of the valves.

4. In an EHB system where pressure in a brake is controlled by the combined action of a first valve and a second valve, a method of controlling the voltage applied to the first valve and the second valve comprising:
    a) controlling the first valve using a leakage control mode when $switch<Q_{dem}<sigma*K_h$, and holding the second valve firmly closed; and
    b) controlling the second valve using a leakage control mode when $-switch>Q_{dem}>-sigma*K_h$, and holding the first valve firmly closed;
wherein $Q_{dem}$ is a demanded flow, sigma is a leakage gain factor, $K_h$ is a hydraulic rain factor, and switch is a threshold demanded flow constant at and below which a constant voltage is applied to each of the valves.

5. In an EHB system where pressure in a brake is controlled by the combined action of a first valve and a second valve, a method of controlling the voltage applied to th(e first valve and the second valve comprising:
    a) controlling the first valve using a leakage control mode when $|switch|<|Q_{dem}|<|sigma*K_h|$, and holding the second valve firmly closed; and
    b) controlling the second valve using a bulk flow mode when $|Q_{dem}|>|sigma*K_h|$, and holding the first valve firmly closed;
wherein $Q_{dem}$ is a demanded flows sigma is a leakage gain factor, $K_h$ is a hydraulic gain factor, and switch is at threshold demanded flow constant at and below which a constant voltage is applied to each of the valves.

6. In an EHB system where pressure in a brake is controlled by the combined action of a first valve and a second valve, a method of controlling the voltage applied to the first valve and the second valve comprising:
    a) controlling the first valve using a bulk flow mode when $|Q_{dem}|>|sigma*K_h|$, and holding the second valve firmly closed; and
    b) controlling the first valve using a leakage control mode when $|switch|<|Q_{dem}|<|sigma*K_h|$, and holding the second valve firmly closed; and
    c) controlling the first valve and the second valve using a pressure control mode when $|Q_{dem}|<|switch|$, holding both said valves firmly closed;
wherein $Q_{dem}$ is a demanded flow, sigma is a leakage gain factor, $K_h$ is a hydraulic gain factor, and switch is a threshold demanded flow constant at and below which a constant voltage is applied to each of the valves.

7. In an EHB system where pressure in a brake is controlled by the combined action of a first valve and a second valve, a method of controlling the voltage applied to the first valve and the second valve comprising:
    a) controlling the first valve using a bulk flow mode when $|Q_{dem}|>|sigma*K_h|$, and holding the second valve firmly closed; and
    b) controlling the first valve using a leakage control mode when $|switch|<|Q_{dem}|<|sigma*K_h|$, and holding the second valve firmly closed; and
    c) controlling the second valve using a leakage control mode when but $|switch|<|Q_{dem}|<|sigma*K_h|$, and holding the first valve firmly closed;
wherein $Q_{dem}$ is a demanded flow, sigma is a leakage gain factor, $K_h$ is a hydraulic gain factor, and switch is a threshold demanded flow constant at and below which a constant voltage is applied to each of the valves.

8. In an EHB system where pressure in a brake is controlled by the combined action of a first valve and a second valve, a method of controlling the voltage applied to the first valve and the second valve comprising:
    a) controlling the first valve using a bulk flow mode when $|Q_{dem}|>|sigma*K_h|$, and holding the second valve firmly closed; and
    b) controlling the first valve using a leakage control mode when $|switch|<|Q_{dem}|<|sigma*K_h|$, and holding the second valve firmly closed; and
    c) controlling the second valve using a bulk flow mode when $|Q_{dem}|>|sigma*K_h|$, and holding the first valve firmly closed, wherein $Q_{dem}$ is a demanded flow, sigma is a leakage gain factor, $K_h$ is a hydraulic gain factor, and switch is a threshold demanded flow constant at and below which a constant voltage is applied to each of the valves.

9. In an EHB system where pressure in a brake is controlled by the combined action of a first valve and a second valve, a method of controlling the voltage applied to the first valve and the second valve comprising:

a) controlling the first valve using a leakage control mode when $|switch|<|Q_{dem}|<|sigma*K_h|$, and holding the second valve firmly closed; and
   b) controlling the first valve and the second valve using a pressure control mode when $|Q_{dem}|<|switch|$, holding both said valves firmly closed; and
   c) controlling the second valve using a bulk flow mode when $|Q_{dem}|>|sigma*K_h|$, and holding the first valve firmly closed;

wherein $Q_{dem}$ is a demanded flow, sigma is a leakage gain factor, $K_h$ is a hydraulic gain factor, and switch is a threshold demanded flow constant at and below which a constant voltage is applied to each of the valves.

10. In an EHB system where pressure in a brake is controlled by the combined action of a first valve and a second valve, a method of controlling the voltage applied to the first valve and the second valve comprising:

a) controlling the first valve using a leakage control mode when $|switch|<|Q_{dem}|<|sigma*K_h|$, and holding the second valve firmly closed; and
    b) controlling the first valve and the second valve using a pressure control mode when $|Q_{dem}|<|switch|$, holding both said valves firmly closed; and
    c) controlling the second valve using a bulk flow mode when $|switch|<|Q_{dem}|<|sigma*K_h|$, and holding the first valve firmly closed;

wherein $Q_{dem}$ is a demanded flow, sigma is a leakage gain factor, $K_h$ is a hydraulic gain factor, and switch is a threshold demanded flow constant at and below which a constant voltage is applied to each of the valves.

11. In an EHB system where pressure in a brake is controlled by the combined action of a first valve and a second valve, a method of controlling the voltage applied to the first valve and the second valve comprising:

a) controlling the first valve using a leakage control mode when $|Q_{dem}|<|sigma*K_h|$, and holding the second valve firmly closed; and
    b) controlling the first valve using a leakage control mode when $|switch|<|Q_{dem}|<|sigma*K_h|$, and holding the second valves firmly closed; and
    c) controlling the first valve and the second valve using a pressure control mode when $|Q_{dem}|<|switch|$, holding both said valves firmly closed; and
    d) controlling the second valve using a leakage control mode when $|switch|<|Q_{dem}|<|sigma*K_h|$, and holding the first valve firmly closed;

wherein $Q_{dem}$ is a demanded flow, sigma is a leakage gain factor, $K_h$ is a hydraulic gain factor, and switch is a threshold demanded flow constant at and below which a constant voltage is applied to each of the valves.

12. In an EHB system where pressure in a brake is controlled by the combined action of a first valve and a second valve, a method of controlling the voltage applied to the first valve and the second valve comprising:

a) controlling the first valve using a leakage control mode when $|Q_{dem}|<|sigma*K_h|$, and holding the second valve firmly closed; and
    b) controlling the first valve using a leakage control mode when $|switch|<|Q_{dem}|<|sigma*K_h|$, and holding the second valve firmly closed; and
    c) controlling the first valve and the second valve using a pressure control mode when $|Q_{dem}|<|switch|$, holding both said valves firmly closed; and
    d) controlling the second valve using a bulk flow mode when $|Q_{dem}|<|sigma*K_h|$, and holding the first valve firmly closed;

wherein $Q_{dem}$ is a demanded flow, sigma is a leakage gain factor, $K_h$ is a hydraulic gain factor, and switch is a threshold demanded flow constant at and below which a constant voltage is applied to each of the valves.

13. In an EHB system where pressure in a brake is controlled by the combined action of a first valve and a second valve, a method of controlling the voltage applied to the first valve and the second valve comprising:

a) controlling the first valve using a bulk flow control method when $|Q_{dem}|>|sigma*K_h|$, and holding the second valve firmly closed; and
    b) controlling the first valve using a leakage control mode when $|switch|<|Q_{dem}|<|sigma*K_h|$, and holding the second valve firmly closed; and
    c) controlling the second valve using a leakage control mode when $|switch|<|Q_{dem}|<|sigma*K_h|$, and holding the first valve firmly closed; and
    d) controlling the second valve using a bulk flow mode when $|Q_{dem}|>|sigma*K_h|$, and holding the first valve firmly closed;

wherein $Q_{dem}$ is a demanded flow, sigma is a leakage gain factor, $K_h$ is a hydraulic gain factor, and switch is a threshold demanded flow constant at and below which a constant voltage is applied to each of the valves.

14. In an EHB system where pressure in a brake is controlled by the combined action of a first valve and a second valve, a method of controlling the voltage applied to the first valve and the second valve comprising:

a) controlling the first valve using a bulk flow mode when $|Q_{dem}|>|sigma*K_h|$, and holding the second valve firmly closed; and
    b) controlling the first valve using a leakage control mode when $|switch|<|Q_{dem}|<|sigma*K_h|$, and holding the second valve firmly closed; and
    c) controlling the first valve and the second valve using a pressure control mode when $|Q_{dem}|<|switch|$, holding both said valves firmly closed; and
    d) controlling the second valve using a leakage control mode when $|switch|<|Q_{dem}|<|sigma*K_h|$, and holding the first valve firmly closed; and
    e) controlling the second valve using a bulk flow control mode when $|Q_{dem}|>|sigma*K_h|$, and holding the first valve firmly closed;

wherein $Q_{dem}$ is a demanded flow, sigma is a leakage gain factor, $K_h$ is a hydraulic gain factor, and switch is a threshold demanded flow constant at and below which a constant voltage is applied to each of the valves.

15. A method of controlling the voltage applied to an apply and dump valve in an EHB system where pressure in a brake is controlled by the combined action of the apply and dump valve comprising:

a) providing an apply and dump valve in a hydraulic circuit, each proportionally controlled by a solenoid;
    b) applying a brake pedal in the EHB system establishing a flow demand within the EHB hydraulic system;
    c) inputting the demanded flow into a control algorithm;

d) computing the voltage required to achieve the demanded flow;

e) applying a voltage across the solenoid to actuate the apply valve to use bulk flow with a flow demand greater than sigma*$K_h$;

f) applying a voltage across the solenoid to actuate the apply valve to use leakage flow with a flow demand greater than switch and less than sigma*$K_h$;

g) applying a voltage to the dump valve to eliminate its leakage when there is a demanded flow greater than negative switch;

h) applying a voltage to the apply valve to eliminate its leakage when there is a demanded flow less than switch;

i) applying a voltage across the solenoid to actuate the dump valve to use bulk flow with a flow demand less than negative sigma*$K_h$; and j) applying a voltage across the solenoid to actuate the dump valve to use leakage flow with a flow demand less than negative switch, but greater than negative sigma*$K_h$;

wherein sigma is a leakage gain factor, and $K_h$ is a hydraulic gain factor.

16. A method of controlling the voltage applied to an apply and dump valve in an EHB system where pressure in a brake is controlled by the combined action of the apply and dump valve where voltage is supplied relative to demanded pressure wherein the method comprises the steps of:

a) controlling voltage applied to an apply valve along a positively sloped first curve of voltage versus demanded flow in a positive flow demand, bulk flow region;

b) controlling voltage applied to an apply valve along a positively sloped second curve of voltage versus demanded flow in a positive flow demand, leakage flow region;

c) controlling voltage applied to an apply valve and dump valve along an unsloped curve of voltage versus demanded flow in a region where flow demand is between a negative switch value and a positive switch value;

d) controlling voltage; applied to a dump valve along a negatively sloped fourth curve of voltage versus demanded flow in a negative flow demand, leakage flow region; and e) controlling voltage applied to a dump valve along a negatively sloped fifth curve of voltage versus demanded flow in a negative flow demand, bulk flow region.

* * * * *

UNITED STATES PATENT AND TRADEMARK OFFICE
CERTIFICATE OF CORRECTION

PATENT NO. : 6,634,722 B1
DATED : October 21, 2003
INVENTOR(S) : Yuhong Zheng et al.

It is certified that error appears in the above-identified patent and that said Letters Patent is hereby corrected as shown below:

Column 17,
Line 25, delete "low" and insert -- flow --.

Column 18,
Line 2, delete "rain" and insert -- gain --.
Line 8, delete "th(e" and insert -- the --;
Line 16, delete "at" and insert -- a --.

Column 19,
Line 33, "bulk flow" and insert -- leakage control --.
Lines 44 and 65, delete "leakage" and insert -- bulk flow --;
Lines 45 and 66, "$|Q_{dem}|<|sigma*K_h|$" and insert --$|Q_{dem}|>|sigma*K_h|$--.

Column 20,
Line 7, after "flow" insert -- control --;
Line 8, "$|Q_{dem}|<|sigma*K_h|$" and insert --$|Q_{dem}|>|sigma*K_h|$--.

Column 22,
Line 18, delete "voltage;" and insert -- voltage --.

Signed and Sealed this

Twenty-third Day of March, 2004

JON W. DUDAS
*Acting Director of the United States Patent and Trademark Office*